Figure 1:
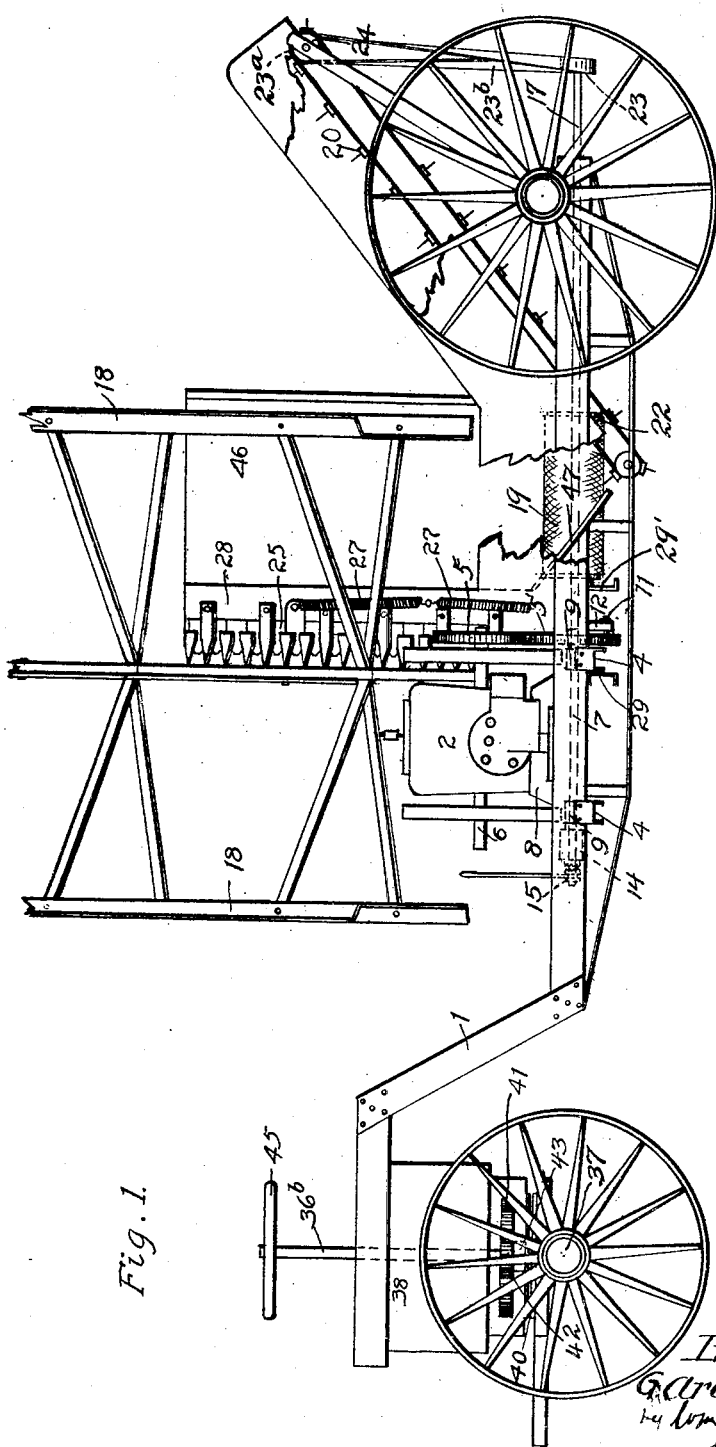

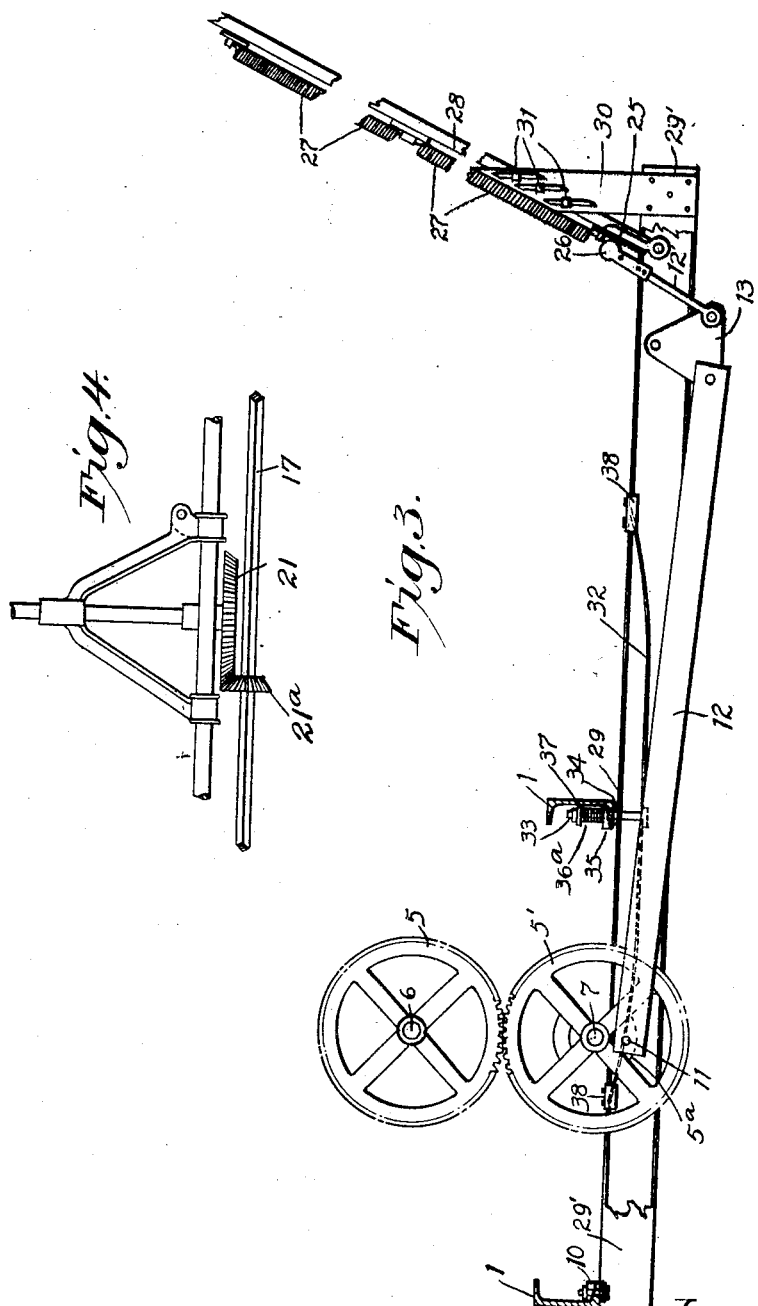

UNITED STATES PATENT OFFICE.

G ARCHIE RUSSELL, OF ORLANDO, FLORIDA.

TREE TRIMMING AND HARVESTING MACHINE.

1,354,267.

Specification of Letters Patent. Patented Sept. 28, 1920.

Application filed April 16, 1918. Serial No. 228,939.

(FILED UNDER THE ACT OF MARCH 3, 1883, 22 STAT. L., 625.)

*To all whom it may concern:*

Be it known that I, G ARCHIE RUSSELL, an employee of the Bureau of Plant Industry of the Department of Agriculture, residing at Orlando, Orange county, Florida, whose post-office address is Orlando, Florida, have invented certain new and useful Improvements in Tree Trimming and Harvesting Machines.

This application is made under the act of March 3, 1883, chapter 143 (22 Stat., 625), and the invention herein described and claimed, may be used by the Government of the United States, or any of its officers or employees, in the prosecution of work for the Government, or any person in the United States, without payment to me of any royalty thereon.

My invention relates to a means of pruning or trimming trees, particularly those growing in rows, and the recovering of the prunings or trimmings from the trees.

The principal objects of my invention are to provide a machine which will trim two sides of a row of trees, one side at a time so that in the end the row will have assumed an inverted V shape and to provide a means of cutting, gathering and disposing of the twigs or cuttings into suitable containers, all at one operation. Other objects of the invention will appear in the following detailed description.

My invention consists generally in various constructions and combinations, all as hereinafter described and particularly pointed out in the claims. The following description sets forth a machine designed primarily for pruning or trimming camphor trees but it will be understood that this machine is intended and adapted for general use wherever applicable and is itself only illustrative of the invention which may be operated in other ways.

In carrying out my invention an internal combustion engine of suitable size and horsepower is mounted on a suitably constructed frame, which in turn is fitted with wheels, making the whole more or less of a modified wagon truck. On the right-hand side of the frame is slung a cutting bar fitted with a knife and a reel for whipping the branches into the cutting blades. Fitted to the back of the cutting bar is a canvas chute 46 which catches the branches as they are cut off and conveys them by gravity to the lower end of the cutting bar. Here the branches are caught up on a moving apron 19, taken to the edge of the iron frame 1 of the truck and dumped into a hopper 47. From this hopper another apron 20 takes the branches and delivers them into sacks or trailers (not shown) of conventional design which may be attached to the frame of the machine in any suitable manner or disposes of them in any manner suitable to the operator. The cutting knives are operated by means of gear wheels fitted to the engine and to suitable shafting, and the power is transmitted from these gear wheels by means of a pitman rod, which in turn operates a rocker arm, one point of which is fastened to the cutter bar by a ball and socket joint. Thus the direction of the stroke may be changed from the horizontal to the angle desired. The reel and carrier aprons are operated by means of a square shafting that runs the entire length of the truck, which shaft is driven by means of a belt and pulleys attached to the engine on the opposite side from that of the gear wheels. The motive power to move the machine forward is optional, being either horses or a tractor.

Figure 2:
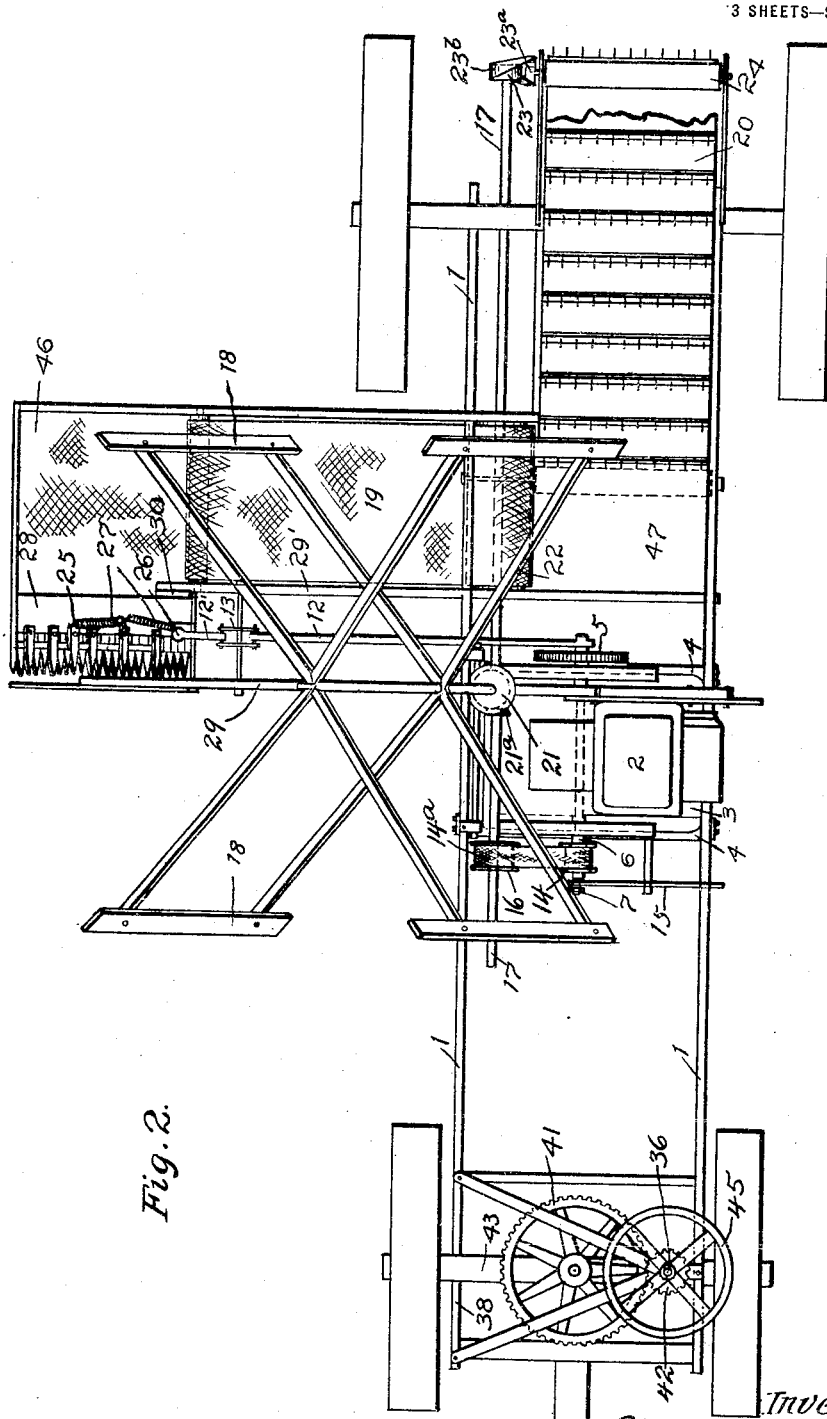

In the accompanying drawings forming part of this specification Figure 1 is a side elevation of a machine constructed in accordance with my invention; Fig. 2 is a plan view thereof; Fig. 3 is a detached view showing the springs that lessen vibration due to the reciprocal motion of the knives, and also showing the method of transmitting power by means of the gear wheel to the rocker arm and cutting blade; Fig. 4 shows the gear drive for the reel.

Referring to the drawings, 1 represents the body frame of the machine upon which is mounted the internal combustion engine 2. The base of the engine 3 rests on four-inch channel irons 4 turned with their concave sides down and bolted in place in such a way that the surface of the channel irons 4 is one inch below the under surface of the frame 1 thus allowing the engine 2 to rest nearer the ground and reduces the diameter required for the gear wheels 5 and 5'. The gear wheels 5 and 5' are 11¾" in diameter and preferably made of cast steel. The upper gear wheel 5 is fitted over the engine shaft 6. The lower gear wheel 5' is fitted over a shaft 7 which passes directly under the engine base 8 and revolves in journals 9 bolted to the channel irons 4. The engine base 8 is cut away to allow for passage of shaft 7. Fastened to an extension 5ª of the lower gear wheel 5′ which is properly balanced and fitted with a steel pin 11, at a proper distance from the center of the gear wheel 5′ is the pitman rod 12, which extends to the rocker arm 13. The shaft 7 which is one inch in diameter extends beyond the engine base 8 far enough to allow a pulley 14 and a clutch 15 to be attached. The pulley 14 is connected by means of a belt 14ª to another pulley 16 which is attached to a square shaft 17, $\frac{3}{4}''\times\frac{3}{4}''$, that runs the whole length of the machine. The clutch 15 is employed to throw the pulley 14 in action and out of action when necessary. Motion is imparted to the reel 18 from the shaft 17 by means of a gear 21ª attached to the shaft 17 which gear 21ª meshes with a gear 21 attached to the reel 18. Motion is imparted to apron 19 from the shaft 17 by means of roller 22 which is attached to shaft 17. Motion is imparted to apron 20 from the shaft 17 by means of a belt 23ᵇ connecting a flanged pulley 23 attached to shaft 17 and a pulley 23ª which is attached to roller 24 over which the apron 20 rolls. The rocker arm 13 is connected with the cutting blade 25 by means of a short-arm pitman rod 12 and a ball and socket joint 26. The return to its original position of the cutting blade is actuated by the springs 27. The complete cutting bar 28 is suspended at the end of two four-inch channel irons 29 and 29′ which also carry the support for the rocker arm 13. This cutting bar 28 is held at the proper angle, between 60° and 70°, by means of the plate 30 and bolts 31. The channel irons 29 and 29′ which pass directly under the frame 1 of the machine are securely bolted at the one side and extend three feet beyond the frame 1 on the opposite side. The front channel iron 29 fits snugly just in front of the engine support 4. It is to be noted that this arrangement takes up the back thrust on the suspending arms. At one side of the frame 1 the channel iron 29 is supported on a leaf spring 32 and is bolted to the frame 1; the bolt 33 passing through both leaf spring 32, channel iron 29, rubber block 34, cast iron seat 35, coiled spring 36ª and washer 37. Between the channel iron 29 and the machine frame 1 a block of hard rubber 34 is placed. The channel iron 29′ is likewise supported and fastened to the machine frame 1. This leaf spring 32, rubber block 34, and coiled spring 36 arrangement takes up the vibration caused by the lifting of the cutting blade 25, and also serves as a protection to the machinery when a sudden back thrust occurs on the bar 28 due to encountering a large limb of a tree.

The steering device consists of a shaft 36, which is suitably secured to the front axle 37, of the machine truck 38, and said shaft 36, passes through a fifth wheel 40, and a bolster 43, to gear wheel 41, which gear wheel 41, meshes with a small gear wheel 42, which is suitably fastened to the top of the front bolster 43, and said small gear wheel is in turn connected to the steering wheel 45, by means of a shaft 36ᵇ.

In operating the machine, the operator first starts the motor 2, which simultaneously sets the cutting blades 25 in motion, then he throws in the clutch 15 which sets the reel 18 and conveyer aprons 19 and 20 in motion. As the machine is drawn forward, the operator holds it to a definite line by means of the steering wheel 45. The cutter bar 28 being held rigid at a predetermined angle, the line of cut is made uniform throughout the row of trees. The reel 18, revolving at a suitable rate of speed, whips the small branches and twigs against the knives 25 where they are severed. At the same time the force of the blow struck by the reel 18 carries the cut branches beyond the knives 25 and deposits them on the canvas slide 46. Here they slip down to the base of the cutter bar 28, are picked up by the moving apron 19 and carried into the hopper 47 where they are picked up by another moving apron 20 which operates at right angles to the first apron 19 and at an elevation to that apron 19 and are deposited in a suitable container (not shown) which is either carried on the truck or trailed behind.

The side bars 29 and 29′ that support the cutter 28, are mounted on springs 32 and 36ª, providing a means of taking up the vibration caused by the lifting of the cutter.

I do not wish to limit myself to the particular construction described and shown, since various modifications may be made by those skilled in the art without departing from the spirit of my invention.

Having thus described my invention I claim:

A tree trimming and harvesting machine comprising a vehicle, a motor mounted thereon, a reel having shafts and gears connecting the same with said motor, cutting mechanism, the lower end of which is secured to a rocker arm, said rocker arm in turn forming contact with a pitman rod which is connected with said motor by gear wheels and shafting, and means for catching branches and twigs of trees severed by the operation of said reel and said cutting mechanism and for conveying said cut branches and twigs to the rear of said vehicle.

In testimony, I affix my signature in the presence of two subscribing witnesses.

G. ARCHIE RUSSELL.

Witnesses:
A. J. DECKER,
G. L. HOFFMAN.